United States Patent Office 3,264,079
Patented August 2, 1966

3,264,079
METHOD OF INSPECTING TEMPERED GLASS SHEETS
Harold E. McKelvey, New Kensington, Pa., assignor to Pittsburgh Plate Glass Company, Pittsburgh, Pa., a corporation of Pennsylvania
No Drawing. Filed Apr. 9, 1962, Ser. No. 185,837
4 Claims. (Cl. 65—29)

The present invention relates to improvement in tempering glass sheets, and particularly concerns a technique for insuring the shipment of properly tempered glass sheets and the elimination from a shipment package of insufficiently tempered glass sheets without requiring a test involving destruction of a random sampling of production items.

The basic process involved in tempering glass is old and described in prior art patents. Such process comprises heating a glass sheet above its annealing range and then rapidly cooling the surfaces of the sheet to set the latter while the center is still hot. This action results in the sheet having its surfaces stressed in compression and its intermediate portion stressed in tension. The stress pattern of a tempered glass sheet makes it much stronger than untempered glass, and, hence, less liable to fracture or shatter.

When the outer surface or compression skin of a tempered glass sheet is broken, the stresses locked up within the intermediate portion of the glass cause the glass to shatter into a large number of very small pieces. These pieces are free from jagged edges that characterize untempered glass. Therefore, the shattering of a tempered glass sheet is less likely to damage a person in its vicinity than a person in the vicinity of an untempered glass sheet that is shattered.

In typical present commercial operations, air under pressure is employed as the quenching fluid. Frequently the pressurized air is passed through nozzles or apertures of a movable plenum chamber attached to a source of air under pressure by means of flexible conduits. Typical tempering apparatus comprises a conveyor extending through a tunnel-like furnace, a quenching station and additional coolers disposed one beyond the other along the path defined by the conveyor.

Unless the glass is quenched promptly after it has been heated to an elevated temperature, the amount of temper imparted to the glass is insufficient to provide the additional resistance to fracture and the production of small, relatively harmless particles upon fracture that characterize tempered glass. Frequently minor leaks or temporary blockages in the air supply system for the quenching station or other failures to supply air under sufficient pressure to cause the glass sheet to be tempered sufficiently occur during the tempering operation. Unless the equipment is constantly monitored, it is quite likely that glass sheets having insufficient temper to meet customer requirements will be produced, packed and shipped. When such glass sheets having insufficient temper are installed in lieu of properly tempered glass sheets, the insufficiently tempered glass sheets are more likely to fracture than the tempered glass sheets and on fracturing are likely to fragment into larger particles more likely to cause damage to people in the vicinity of the fractured sheet than sheets having sufficient temper.

In the past, spot checks were made to determine the strength of production items by destroying a tempered plate from each hundred plates produced, say, and determining the particle size of each destroyed plate. Such random sampling did not preclude the possibility of producing occasional defective plates due to temporary variables in the operation of the tempering apparatus.

Accordingly, it is an object of the present invention to provide a method of testing all plates produced on a tempering line to continually distinguish glass sheets having proper temper from those that are insufficiently tempered without requiring operating personnel constantly tending the tempering apparatus or periodic destruction tests which provide only a random sampling at best so that insufficiently tempered glass sheets may be removed from the remainder of glass sheets being fabricated.

According to the present invention, the above object is accomplished by determining the expected temperature range of properly tempered glass sheets as they are conveyed past a given location beyond the quenching station of tempering apparatus, or at the end of a predetermined time interval following the onset of the quenching step but before the glass temperature cools to room temperature, monitoring the temperature of each glass sheet as it passes the given location or at the end of said predetermined time interval to determine which sheets have a temperature above a predetermined temperature slightly above the expected temperature and which sheets have a temperature below said predetermined temperature and removing the relatively hot sheets by automatically destroying those sheets having a surface temperature above said predetermined temperature at said given location or at the end of said predetermined time interval.

The temperature sensing device actuates a relay whenever it senses a glass sheet temperature to be above the predetermined level. The relay operates a solenoid valve controlling the application of a water spray which destroys the relatively hot glass sheets.

The thermosensitive element is preferably of a type similar to the glass surface pyrometer described in U.S. Patent No. 2,917,871 to Atkeson as being trained on the surface of a glass sheet to determine its temperature. Preferably this optical pyrometer is disposed to face the path travelled by glass sheets along the conveyor and is focused on the plane of the path travelled by the glass through said given location so that the thermosensitive element is able to "read" the glass surface temperature.

The thermosensitive element is preferably located in a position facing a portion of the conveyor for the tempering apparatus where the glass surface temperature under normal operating conditions is cooled to a temperature range between 500 and 750 degrees Fahrenheit so that the control may be set to operate the solenoid valve when the glass temperature read by the glass scanning pyrometer "reads" 800 degrees Fahrenheit or more. It is understood that the exact temperature range expected for any given location along the tempering conveyor depends upon the glass composition and glass thickness for any given furnace heating pattern, rate of air flow in its quenching unit and the period of exposure of the glass to the heating and cooling cycles. For example, in a location where commercial clear soda-lime-silica plate glass sheets of one-quarter inch nominal thickness can be expected to have a temperature of 600 degrees Fahrenheit, sheets of the same dimensions differing only in the incorporation of about 0.5 percent by weight of iron oxide instead of about 0.1 percent by weight of iron oxide as in clear plate glass had a temperature of 630 degrees Fahrenheit.

A device of this type was tested in two furnaces. In one furnace, the temperature readings of an optical pyrometer trained on a particular sector of the conveyor beyond the quenching station traversed by the glass sheets read 750 degrees Fahrenheit for the glass with the quenching apparatus performing properly. The air supply for the quenching apparatus was turned off and the optical pyrometer recorded a temperature of 1050 degrees Fahrenheit for unquenched glass sheets traversing the monitored sector.

In another line producing another part, normal operation yielded optical pyrometer readings of 700 degrees Fahrenheit for glass surfaces with the quenching station performing properly. When the air supply for the quenching apparatus was turned off, simulating a breakdown, the temperature reading of the glass rose to 930 degrees Fahrenheit.

Having established that the principle of the present invention is operative, a glass surface pyrometer was adjusted to actuate a solenoid valve in response to a glass temperature reading of 820 degrees Fahrenheit in a position where the glass temperature was expected to be 650 degrees Fahrenheit. The system was used in a line for fabricating bent tempered automotive backlights from sheets about 65 inches long and about 24 inches wide precut to outline and having a nominal thickness of one-quarter inch.

In the tempering apparatus, the glass sheets were heated for four minutes in a furnace maintained at an average ambient temperature of 1250 degrees Fahrenheit and then moved in about 4 seconds to a reciprocating quenching station supplying air toward both major glass sheet surfaces at room temperature (about 100 degrees Fahrenheit) through parallel curved slots having a width of one-quarter inch and spaced 6 inches center to center at a pressure of 6 ounces per square inch for a period of 22 seconds (including the 4 seconds required by the sheet to move from the furnace to the conveyor).

A water spray was applied upwardly from 6 inches below the glass through an orifice of a water pipe of 1/16 inch diameter connected to a water line maintained at a pressure of 70 pounds per square inch to impinge on the glass sheets whose surface temperature was above 820 degrees Fahrenheit at a rate of 50 gallons per hour. The relatively hot sheets were fractured by thermal shock and their fragments fell below the conveyor into a collection pit from which they were removed.

The cooler sheets were not subjected to a water spray and therefore continued along the conveyor to an unloading station at the end thereof. The latter glass sheets were packed for shipment with the packers assured that the glass sheets had sufficient temper to satisfy customer and safety code requirements.

While it is quite convenient to destroy those sheets which are not adequately tempered so as to remove them from the conveyor leading to the exit of the tempering apparatus where only the satisfactory plates are packed for shipment, the present invention recognizes that the sheets not sufficiently tempered may be salvaged by applying a light mark that is easily removed, such as a pulverulent frit, rather than a water spray which destroys the sheet. However, in countries where labor costs for handling the glass is relatively high compared to the cost of the raw materials, it is cheaper to destroy the sheets.

The glass surface temperature monitoring system described above may be made more sophisticated by including a warning buzzer or bell operable at a lower temperature than the temperature for energizing the solenoid valve that actuates the water spray. This warning bell serves to alert plant personnel that the efficiency of the tempering apparatus is lessening so that repairs may be made before the need arises to destroy glass plates rather than prepare them for shipment. If the warning is heeded promptly, it is possible that repairs can be made without loss of a single plate.

The form of the invention described herein represents an illustrative preferred embodiment and certain modifications thereof. It is understood that various changes may be made without departing from the spirit of the invention as defined in the claimed subject matter which follows.

What is claimed is:

1. In the process of tempering glass sheets by first heating the glass sheets in a relatively hot atmosphere to an elevated temperature sufficient for tempering and suddenly quenching the heated glass sheets with a chilling fluid in a relatively cold atmosphere for sufficient time to impart a temper thereto under normal operating conditions, the improvement comprising sensing the temperature of each said treated glass sheet at the end of said time but before the sheet cools to room temperature to determine whether the temperature of said treated glass sheet is above or below the temperature of properly tempered glass at that time, and marking only said treated glass sheets whose measured temperature is above said temperature of properly tempered glass to distinguish said treated glass sheets whose temperature is above said temperature of properly tempered glass from those whose temperature is that of properly tempered glass.

2. In the process of tempering glass sheets by first heating the glass sheets in a relatively hot atmosphere to an elevated temperature sufficient for tempering and suddenly quenching the heated glass sheets with a chilling fluid in a relatively cold atmosphere for sufficient time to impart a temper thereto under normal operating conditions, the improvement comprising sensing the temperature of each said treated glass sheet at the end of said time but before the sheet cools to room temperature to determine whether the temperature of said treated glass sheet is above or below the temperature of properly tempered glass at that time, and destroying only said sheets whose measured temperature is above said temperature of properly tempered glass with cool fluid before said sheets cool to room temperature.

3. In the process of tempering glass sheets by conveying the glass sheets through a hot atmosphere for a time sufficient to raise the glass sheets to an elevated temperature sufficient for tempering and immediately conveying the heated glass sheets into a relatively cold atmosphere where the surfaces of the glass sheets are suddenly chilled for a period sufficient to impart a temper to said treated sheets, the improvement comprising sensing the temperature of each said treated glass sheet when it is conveyed past a location beyond said region of sudden chilling but close enough so that said sheets have not reached room temperature to determine whether its temperature is above the temperature of properly tempered glass at said location and marking only said glass sheets whose temperature at said location is above said temperature of properly tempered glass to distinguish said treated glass sheets whose temperature at said location is above said temperature of properly tempered glass from those whose temperature at said location is that of properly tempered glass.

4. In the process of tempering glass sheets by conveying the glass sheets through a hot atmosphere for a time sufficient to raise the glass sheets to an elevated temperature sufficient for tempering and immediately conveying the heated glass sheets into a relatively cold atmosphere where the surfaces of the glass sheets are suddenly chilled for a period sufficient to impart a temper to said treated sheets, the improvement comprising sensing the temperature of each said treated glass sheet when it is conveyed past a location beyond said region of sudden chilling but close enough so that said sheets have not reached room temperature to determine whether its temperature is above the temperature of properly tempered glass at said location and destroying only said sheets whose measured temperature is above said temperature of properly tempered glass with cool fluid before said sheets cool to room temperature.

References Cited by the Examiner
UNITED STATES PATENTS 2,669,069  2/1954  Merrill _____ 65—29
3,191,857  6/1965  Galey et al. _____ 65—160

DONALL H. SYLVESTER, *Primary Examiner.*

G. R. MYERS, *Assistant Examiner.*